United States Patent
Fang

(10) Patent No.: US 10,914,859 B2
(45) Date of Patent: Feb. 9, 2021

(54) REAL-TIME TRUE RESISTIVITY ESTIMATION FOR LOGGING-WHILE-DRILLING TOOLS

(71) Applicant: BAKER HUGHES INCORPORATED, Houston, TX (US)

(72) Inventor: Sheng Fang, Houston, TX (US)

(73) Assignee: BAKER HUGHES HOLDINGS LLC, Houston, TX (US)

(*) Notice: Subject to any disclaimer, the term of this patent is extended or adjusted under 35 U.S.C. 154(b) by 766 days.

(21) Appl. No.: 15/336,583

(22) Filed: Oct. 27, 2016

(65) Prior Publication Data

US 2017/0123097 A1 May 4, 2017

Related U.S. Application Data

(60) Provisional application No. 62/247,679, filed on Oct. 28, 2015.

(51) Int. Cl.
*G01V 3/38* (2006.01)
*G01N 27/04* (2006.01)
*G01V 3/30* (2006.01)

(52) U.S. Cl.
CPC ............. *G01V 3/38* (2013.01); *G01N 27/041* (2013.01); *G01V 3/30* (2013.01)

(58) Field of Classification Search
None
See application file for complete search history.

(56) References Cited

U.S. PATENT DOCUMENTS

| | | | |
|---|---|---|---|
| 5,883,515 A | 3/1999 | Strack et al. | |
| 6,944,546 B2 | 9/2005 | Xiao et al. | |
| 7,574,410 B2 * | 8/2009 | Strack | G01V 3/083 706/21 |
| 2002/0040274 A1 | 4/2002 | Yin et al. | |
| 2003/0055566 A1 * | 3/2003 | Kriegshauser | G01V 3/28 702/7 |
| 2004/0257240 A1 | 12/2004 | Chen et al. | |
| 2006/0038571 A1 | 2/2006 | Ostermeier et al. | |
| 2007/0256832 A1 | 11/2007 | Hagiwara et al. | |
| 2009/0198447 A1 * | 8/2009 | Legendre | G01V 1/50 702/11 |
| 2012/0059586 A1 | 3/2012 | Itskovich et al. | |

(Continued)

FOREIGN PATENT DOCUMENTS

CA 2895671 A1 8/2014

OTHER PUBLICATIONS

Int'l Search Report & Written Opinion in PCT/US2016/059437 dated Feb. 16, 2017.

*Primary Examiner* — Gregory J Toatley, Jr.
*Assistant Examiner* — Brandon J Becker
(74) *Attorney, Agent, or Firm* — Mossman, Kumar & Tyler, P.C.

(57) ABSTRACT

Systems, methods, and devices for evaluation of an earth formation intersected by a borehole using a logging tool. Methods include making EM measurements on a single logging run while drilling using an EM tool on a tool string in a substantially horizontally aligned section of the borehole at a plurality of borehole depths; estimating, at each of the plurality of borehole depths, a true resistivity of a volume of interest of the formation in which the tool sits in substantially real time while on the single logging run while drilling.

20 Claims, 8 Drawing Sheets

(56) References Cited

U.S. PATENT DOCUMENTS

| | | | | |
|---|---|---|---|---|
| 2013/0090855 A1* | 4/2013 | Rasmus | .................. | E21B 21/08 |
| | | | | 702/9 |
| 2013/0297214 A1 | 11/2013 | Reiderman | | |
| 2014/0032116 A1* | 1/2014 | Guner | ...................... | G01V 3/30 |
| | | | | 702/6 |
| 2014/0306711 A1* | 10/2014 | Hu | ........................... | G01V 3/20 |
| | | | | 324/367 |
| 2015/0134255 A1* | 5/2015 | Zhang | ................. | G01V 99/005 |
| | | | | 702/7 |
| 2015/0160367 A1* | 6/2015 | Le | ........................... | G01V 3/28 |
| | | | | 324/339 |
| 2016/0178787 A1* | 6/2016 | Le | ........................... | G01V 3/28 |
| | | | | 702/7 |

\* cited by examiner

REAL-TIME TRUE RESISTIVITY ESTIMATION FOR LOGGING-WHILE-DRILLING TOOLS

CROSS REFERENCE TO RELATED APPLICATION

This application claims benefit of Provisional Patent Application No. 62/247,679 filed Oct. 28, 2015, all of which is incorporated herein by reference in its entirety.

FIELD

In one aspect, the present disclosure generally relates to methods, systems, and devices for earth formation evaluation including determining properties of the earth formation. More specifically, the present disclosure relates to measurements of true resistivity using electromagnetic signals in a borehole penetrating the earth formation. These measurements may be used in exploration for hydrocarbons and/or water in the earth formation.

BACKGROUND

Electrical well logging is well known and various devices and various techniques have been described for this purpose. Properties of the formation may be estimated by creating electromagnetic (EM) excitation in the formation with at least one transmitter, and receiving related signals at one or more receiver antennas. Estimation of these properties aids in understanding the structure of the earth formation, which enables and/or facilitates exploration and development of the formation.

Logging instruments may be used to determine true formation resistivity, which is an important formation property for characterizing, modeling, and conducting operations on the formation. Historically, measurements of resistivity, or its inverse, conductivity, have been used for, among other reasons, inferring the fluid content of the earth formations and distances to bed boundaries. Also, lower conductivity (higher resistivity) measurements may be indicative of hydrocarbon-bearing earth formations.

However, conventional EM logging measurements are directly responsive to the electrical properties of the volumes of the earth formation surrounding the logging tool. These measurements may be problematic in layered formations, especially when the tool is proximate a boundary. Polarization horn effects and other effects may produce direct measurements which are unrepresentative of the true formation resistivity, leading to incorrect characterization of the formation geology.

SUMMARY

In aspects, the present disclosure is related to systems, methods and devices for evaluating an earth formation intersected by a borehole using a logging tool. Methods include making EM measurements on a single logging run while drilling using an EM tool on a tool string in a substantially horizontally aligned section of the borehole at a plurality of borehole depths; estimating, at each of the plurality of borehole depths, a true resistivity of a volume of interest of the formation in which the tool sits in substantially real time while on the single logging run while drilling by: identifying, for a set of distance values representing possible distances from the tool to an interface between two adjacent layers substantially parallel to a longitudinal axis of the tool, layer resistivities corresponding to the two adjacent layers for each distance value by minimizing a difference between expected measurement values corresponding to the distance value and actual values of the EM measurements; selecting a subset of distance values corresponding to a subset of least misfits; identifying a distance value from the subset of distance values that is associated with identified layer resistivities including a minimum resistivity; estimating true resistivity as either that upper layer resistivity or that lower layer resistivity associated with the identified distance value; and interpolating one or more of the true resistivity estimates over a window of multiple depths of the plurality of depths using a subset of the true resistivity estimates by correcting outlier values.

Interpolating may include smoothing the true resistivity estimates for the plurality of borehole depths by adjusting the true resistivity estimate for at least one borehole depth. The volume of interest may be modeled with the interface represented as a depth value 0 on a number line with negative value above the interface and positive values below the interface, the method comprising estimating true resistivity as the lower layer resistivity when the identified distance value for measurements lies at a point greater than zero in the model, and estimating true resistivity as the upper layer resistivity when the identified distance value for measurements lies at a point less than zero in the model. The difference may comprise a weighted L2 norm between the expected measurement values and the actual values. Identifying the layer resistivities may include enforcing at least one of: i) resistivity limits, and ii) relative change relationships. Methods may include selecting a window length for the window based on at least one of: i) variation of the EM measurements along the borehole; ii) a resolution of formation changes in the window. The window length may be fixed and the number of measurement depths in the window may vary over time. Methods may include estimating the expected measurement values using at least one neural network. The neural network may be trained using synthetic tool responses for a plurality of two-layer models, each model of the plurality of models comprising an upper layer resistivity, a lower layer resistivity, and a distance from a model tool to a model interface.

The volume of interest may include or consist of a region of the formation extending substantially from a wall of the borehole to a maximum depth of investigation for the tool. Methods may include selecting the subset from a group of most closed resistivity values, and using true resistivity values estimated at earlier depths as inputs for later estimations. Selecting the subset of layer resistivities corresponding to the subset of least misfits may include selecting the subset of layer resistivities corresponding to a minimum misfit and at least one additional misfit below a threshold value, wherein the threshold value is a function of the minimum misfit.

Embodiments include apparatus for evaluating an earth formation intersected by a borehole. Apparatus may include a carrier, such as, for example, a drill string, comprising an electromagnetic measurement tool configured to make electromagnetic (EM) measurements on a single logging run while drilling responsive to an EM excitation of the formation at at least one frequency at a plurality of borehole depths; and at least one processor. The at least one processor may be configured to estimate, while the tool is in a substantially horizontally aligned section of the borehole, at each of the plurality of borehole depths, a true resistivity of a volume of interest of the formation in which the tool sits in substantially real time while on the single logging run while drilling by: identifying, for a set of distance values representing possible distances from the tool to an interface between two adjacent layers substantially parallel to a longitudinal axis of the tool, layer resistivities corresponding to the two adjacent layers for each distance value by minimizing a difference between expected measurement values corresponding to the distance value and actual values of the EM measurements; selecting a subset of distance values corresponding to a subset of least misfits; identifying a distance value from the subset of distance values that is associated with identified layer resistivities including a minimum resistivity; estimating true resistivity as either that upper layer resistivity or that lower layer resistivity associated with the identified distance value; interpolating one or more of the true resistivity estimates over a window of multiple depths of the plurality of depths using a subset of the true resistivity estimates by correcting outlier values. The processor may be further configured to carry out methods of the present disclosure as described herein.

The at least one processor may include one or more computer processors operatively coupled with at least one computer memory and configured so the computer memory is accessible to the at least one processor. The computer memory may be implemented as a non-transitory computer readable medium having disposed thereon computer program instructions for implementing the methods described herein.

Examples of the more important features of the disclosure have been summarized rather broadly in order that the detailed description thereof that follows may be better understood and in order that the contributions they represent to the art may be appreciated.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein.

DETAILED DESCRIPTION

Figure 1A:
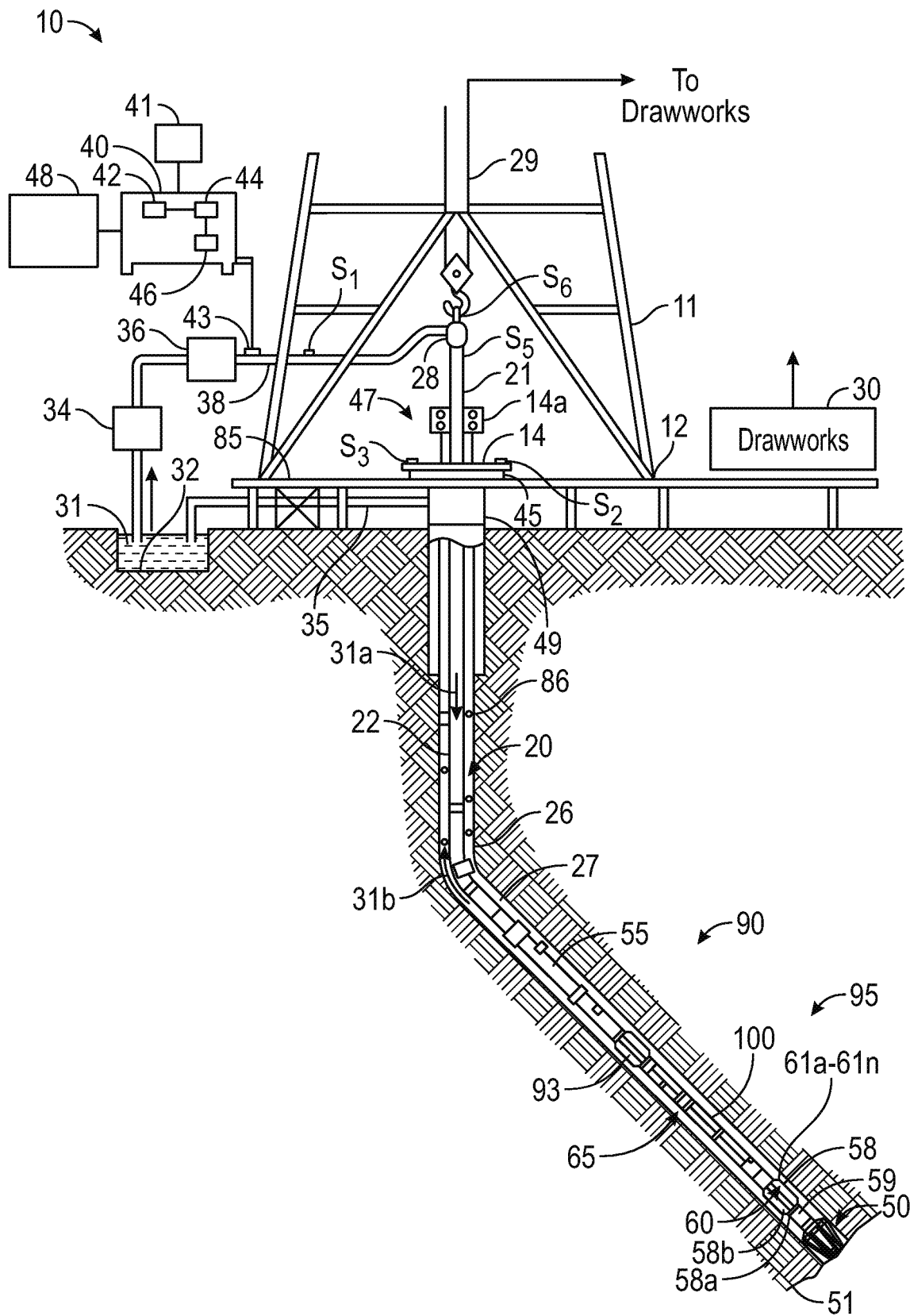
FIG. 1A shows an exemplary embodiment of a system for evaluation of an earth formation using measurements from a downhole electromagnetic tool in accordance with embodiments of the present disclosure.

This disclosure generally relates to evaluation of an earth formation, which may include exploration for hydrocarbons involving electromagnetic investigations of a borehole penetrating the earth formation. These investigations may include estimating at least one parameter of interest of the earth formation.

Aspects of the present disclosure relate to apparatus and methods for electromagnetic well logging for evaluating an earth formation. More specifically, the present disclosure relates to estimating and displaying properties of the formation relating to electromagnetic (EM) measurements. The formation may be intersected by a wellbore and the measurements may be taken in the wellbore. The EM measurements may be used to estimate the parameter of interest. Aspects of the present disclosure facilitate the display and analysis of EM measurements. Further aspects may include methods for conducting a drilling operation by estimating the parameter of interest (e.g., true resistivity) in real-time during the drilling operation and conducting the drilling operation in dependence upon the estimate.

The present disclosure is susceptible to embodiments of different forms. There are shown in the drawings, and herein will be described in detail, specific embodiments of the present disclosure with the understanding that the present disclosure is to be considered as an exemplification of the principles of the disclosure, and is not intended to limit the disclosure to that illustrated and described herein. Indeed, as will become apparent, the teachings of the present disclosure can be utilized for a variety of well tools and in all phases of well construction and production. Accordingly, the embodiments discussed below are merely illustrative of the applications of the present disclosure.

Downhole electromagnetic measurement tools are well known in the art. Aspects of the present disclosure may include various components for performing an electromagnetic excitation including exciting currents or electric (or magnetic) fields, generating electromagnetic waves, or other electrical phenomena in a formation surrounding a borehole, and for sensing electrical effects of the generated phenomena, such as, for example, a plurality of coils or pads. A component (e.g., a coil or a ring electrode) referred to herein as a transmitter may generate an oscillating signal in an adjacent geological formation, e.g., by supplying a square wave signal or other oscillating signal to a coil. Any number of oscillating voltage signals having multiple frequency components may be used. It may also be desirable that, on occasion, a single-frequency signal, such as a sinusoidal signal, is used. One application for downhole measurements is formation evaluation, where the goal is to evaluate the oil content of a possible reservoir.

FIG. 1A shows an exemplary embodiment of a system for evaluation of an earth formation using measurements from a downhole electromagnetic tool. The system 10 includes a carrier 11 that is shown disposed in a wellbore or borehole 26 that penetrates at least one earth formation 95. The system 10 also includes a tool 100 configured for taking electromagnetic measurements in the borehole.

As described herein, "borehole" or "wellbore" refers to a single hole that makes up all or part of a drilled well. Depending on the configuration, the system 10 may be used during drilling and/or after the wellbore 12 has been formed. While a land system is shown, the teachings of the present disclosure may also be utilized in offshore or subsea applications. As described herein, "formations" refer to the various features and materials that may be encountered in a subsurface environment and surround the borehole. The term "information" includes, but is not limited to, raw data, processed data, and signals.

FIG. 1A shows a drill string 20 including a bottomhole assembly (BHA) 90 conveyed in the borehole 26 as the carrier. The drilling system 10 includes a conventional derrick 11 erected on a platform or floor 12 which supports a rotary table 14 that is rotated by a prime mover, such as an electric motor (not shown), at a desired rotational speed. A tubing (such as jointed drill pipe 22), having the drilling assembly 90, attached at its bottom end extends from the surface to the bottom 51 of the borehole 26. A drill bit 50, attached to drilling assembly 90, disintegrates the geological formations when it is rotated to drill the borehole 26. The drill string 20 is coupled to a drawworks 30 via a Kelly joint 21, swivel 28 and line 29 through a pulley. Drawworks 30 is operated to control the weight on bit ("WOB"). The drill string 20 may be rotated by a top drive (not shown) instead of by the prime mover and the rotary table 14. Alternatively, a coiled-tubing may be used as the tubing 22. A tubing injector 14a may be used to convey the coiled-tubing having the drilling assembly attached to its bottom end. The operations of the drawworks 30 and the tubing injector 14a are known in the art and are thus not described in detail herein.

It should be understood that embodiments of the present disclosure are well suited for use in wells having various configurations including horizontal wells, deviated wells, slanted wells, multilateral wells and so on. Accordingly, use of directional terms herein (e.g., above, below, upper, lower, upward, downward, topmost, lowermost, uphole, downhole, etc) refer to the direction of travel along the borehole either toward or away from the surface, with the upward direction being toward the surface and the downward direction being away from the surface.

A suitable drilling fluid 31 (also referred to as the "mud") from a source 32 thereof, such as a mud pit, is circulated under pressure through the drill string 20 by a mud pump 34. The drilling fluid 31 passes from the mud pump 34 into the drill string 20 via a desurger 36 and the fluid line 38. The drilling fluid 31a from the drilling tubular discharges at the borehole bottom 51 through openings in the drill bit 50. The returning drilling fluid 31b circulates uphole through the annular space 27 between the drill string 20 and the borehole 26 and returns to the mud pit 32 via a return line 35 and drill cutting screen 85 that removes the drill cuttings 86 from the returning drilling fluid 31b. A sensor S1 in line 38 provides information about the fluid flow rate. A surface torque sensor S2 and a sensor S3 associated with the drill string 20 respectively provide information about the torque and the rotational speed of the drill string 20. Tubing injection speed is determined from the sensor S5, while the sensor S6 provides the hook load of the drill string 20.

Well control system 47 is placed at the top end of the borehole 26. The well control system 47 includes a surface blow-out-preventer (BOP) stack 15 and a surface choke 49 in communication with a wellbore annulus 27. The surface choke 49 can control the flow of fluid out of the borehole 26 to provide a back pressure as needed to control the well.

In some applications, the drill bit 50 is rotated by only rotating the drill pipe 22. However, in many other applications, a downhole motor 55 (mud motor) disposed in the BHA 90 also rotates the drill bit 50. The rate of penetration (ROP) for a given BHA largely depends on the WOB or the thrust force on the drill bit 50 and its rotational speed.

A surface control unit or controller 40 receives signals from the downhole sensors and devices via a sensor 43 placed in the fluid line 38 and signals from sensors S1-S6 and other sensors used in the system 10 and processes such signals according to programmed instructions provided to the surface control unit 40. The surface control unit 40 displays desired drilling parameters and other information on a display/monitor 41 that is utilized by an operator to control the drilling operations. The surface control unit 40 may be a computer-based unit that may include a processor 42 (such as a microprocessor), a storage device 44, such as a solid-state memory, tape or hard disc, and one or more computer programs 46 in the storage device 44 that are accessible to the processor 42 for executing instructions contained in such programs. The surface control unit 40 may further communicate with a remote control unit 48. The surface control unit 40 may process data relating to the drilling operations, data from the sensors and devices on the surface, and data received from downhole; and may control one or more operations of the downhole and surface devices. The data may be transmitted in analog or digital form.

The BHA 90 may include a tool 100 configured for performing electromagnetic (EM) measurements. The BHA 90 may also contain other formation evaluation sensors or devices (also referred to as measurement-while-drilling ("MWD") or logging-while-drilling ("LWD") sensors) determining resistivity, density, porosity, permeability, acoustic properties, nuclear-magnetic resonance properties, formation pressures, properties or characteristics of the fluids downhole and other desired properties of the formation 95 surrounding the BHA 50. For convenience, all such sensors are generally denoted herein by numeral 65. The BHA 90 may further include a variety of other sensors and devices 59 for determining one or more properties of the BHA 90, such as vibration, bending moment, acceleration, oscillations, whirl, stick-slip, weight-on-bit, fluid flow rate, pressure, temperature, rate of penetration, azimuth, tool face, drill bit rotation, etc.

The BHA 90 may include a steering apparatus or tool 58 for steering the drill bit 50 along a desired drilling path. In one aspect, the steering apparatus may include a steering unit 60, having a number of force application members 61a-61n. The force application members may be mounted directly on the drill string, or they may be at least partially integrated into the drilling motor. In another aspect, the force application members may be mounted on a sleeve, which is rotatable about the center axis of the drill string. The force application members may be activated using electro-mechanical, electro-hydraulic or mud-hydraulic actuators. In yet another embodiment the steering apparatus may include a steering unit 58 having a bent sub and a first steering device 58a to orient the bent sub in the wellbore and the second steering device 58b to maintain the bent sub along a selected drilling direction. The steering unit 58, 60 may include near-bit inclinometers and magnetometers.

The drilling system 10 may include sensors, circuitry and processing software and algorithms for providing information about desired drilling parameters relating to the BHA, drill string, the drill bit and downhole equipment such as a drilling motor, steering unit, thrusters, etc. Many current drilling systems, especially for drilling highly deviated and horizontal wellbores, utilize coiled-tubing for conveying the drilling assembly downhole. In such applications a thruster may be deployed in the drill string 20 to provide the required force on the drill bit.

Exemplary sensors for determining drilling parameters include, but are not limited to drill bit sensors, an RPM sensor, a weight on bit sensor, sensors for measuring mud motor parameters (e.g., mud motor stator temperature, differential pressure across a mud motor, and fluid flow rate through a mud motor), and sensors for measuring acceleration, vibration, whirl, radial displacement, stick-slip, torque, shock, vibration, strain, stress, bending moment, bit bounce, axial thrust, friction, backward rotation, BHA buckling, and radial thrust. Sensors distributed along the drill string can measure physical quantities such as drill string acceleration and strain, internal pressures in the drill string bore, external pressure in the annulus, vibration, temperature, electrical and magnetic field intensities inside the drill string, bore of the drill string, etc. Suitable systems for making dynamic downhole measurements include COPILOT, a downhole measurement system, manufactured by BAKER HUGHES INCORPORATED.

The drilling system 10 can include one or more downhole processors at a suitable location such as 93 on the BHA 90. The processor(s) can be a microprocessor that uses a computer program implemented on a suitable non-transitory computer-readable medium that enables the processor to perform the control of system 10 and processing of information, such as information from the sensors. The non-transitory computer-readable medium may include one or more ROMs, EPROMs, EAROMs, EEPROMs, flash memories, RAMs, hard drives and/or optical disks. Other equipment such as power and data buses, power supplies, and the like will be apparent to one skilled in the art. In one embodiment, the MWD system utilizes mud pulse telemetry to communicate data from a downhole location to the surface while drilling operations take place. The surface processor 42 can process the surface measured data, along with the data transmitted from the downhole processor, to evaluate the formation.

In embodiments, true resistivity is estimated in substantially real-time downhole and then transmitted uphole, thus reducing the information density of communications to the surface (and, hence, decreasing bandwidth necessary for the system).

Figure 1B:
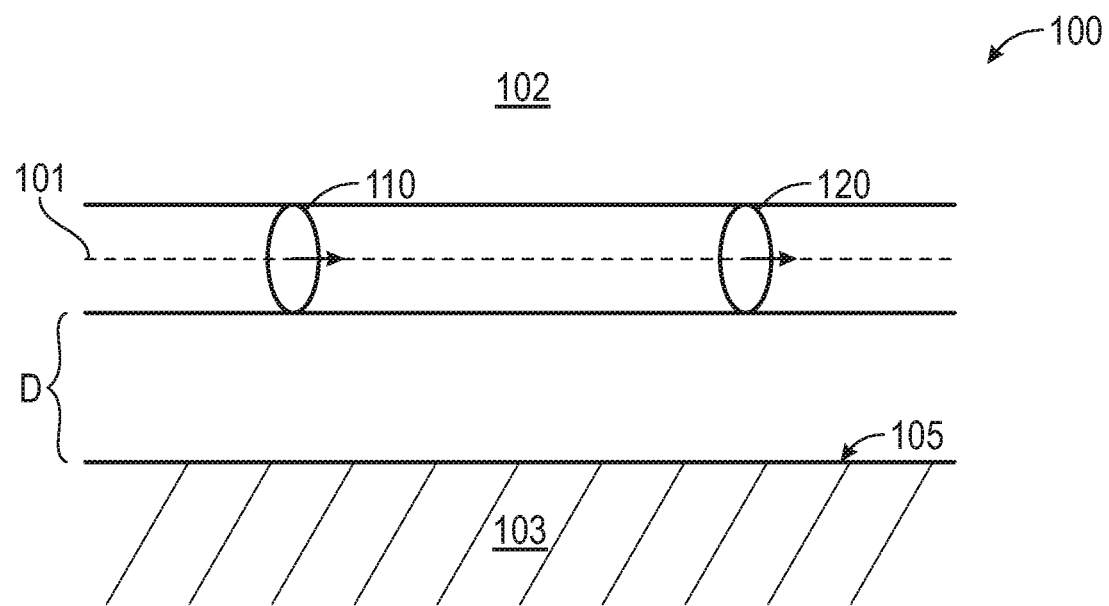
FIG. 1B illustrates an EM tool in a subterranean environment in accordance with embodiments of the present disclosure.

A point of novelty of the system illustrated in FIGS. 1A & 1B is that the surface processor 42 and/or the downhole processor 93 are configured to perform certain methods (discussed below) that are not in the prior art. Surface processor 42 or downhole processor 93 may be configured to control steering apparatus 58, mud pump 34, drawworks 30, rotary table 14, downhole motor 55, other components of the BHA 90, or other components of the drilling system 10. Surface processor 42 or downhole processor 93 may be configured to control sensors described above and to estimate a parameter of interest according to methods described herein.

Control of these components may be carried out using one or more models using methods described below. For example, surface processor 42 or downhole processor 93 may be configured to modify drilling operations i) autonomously upon triggering conditions, ii) in response to operator commands, or iii) combinations of these. Such modifications may include changing drilling parameters, steering the drillbit (e.g., geosteering), and so on. Control of these devices, and of the various processes of the drilling system generally, may be carried out in a completely automated fashion or through interaction with personnel via notifications, graphical representations, user interfaces and the like. Reference information accessible to the processor may also be used. In some general embodiments, surface processor 42, downhole processor 93, or other processors (e.g. remote processors) may be configured to operate the EM tool 100 to excite and measure EM signals.

The system 10 may include any number of downhole tools for various processes including formation drilling, geosteering, and formation evaluation (FE) for measuring versus depth and/or time one or more physical quantities in or around a borehole. The tool 100 may be included in or embodied as a BHA, drillstring component or other suitable carrier.

While a drill string 20 is shown as a conveyance device for tool 100, it should be understood that embodiments of the present disclosure may be used in connection with tools conveyed via rigid (e.g. jointed tubular or coiled tubing) as well as non-rigid (e. g. wireline, slickline, e-line, etc.) conveyance systems. The drilling system 10 may include a bottomhole assembly and/or sensors and equipment for implementation of embodiments of the present disclosure on either a drill string or a wireline. "Carrier" as described herein means any device, device component, combination of devices, media and/or member that may be used to convey, house, support or otherwise facilitate the use of another device, device component, combination of devices, media and/or member. Exemplary non-limiting carriers include drill strings of the coiled tubing type, of the jointed pipe type and any combination or portion thereof. Other carriers include, but are not limited to, casing pipes, wirelines, wireline sondes, slickline sondes, drop shots, downhole subs, bottom-hole assemblies, and drill strings.

Mathematical models, look-up tables, or other models representing relationships between the signals and the values of the formation properties may be used to characterize operations in the formation or the formation itself, optimize one or more operational parameters of a production or development, and so on. The system may carry out these actions through notifications, advice, and/or intelligent control.

Various types of electrical sensors may be used in evaluating the formation in accordance with embodiments disclosed herein. As one example, sensors that are based on electromagnetic (EM) wave propagation are used for many applications where amplitude and phase of wave traveled in an unknown medium are studied to infer the properties of that medium. Although aspects of the disclosure may be particularly useful in addressing challenges associated with (EM) wave propagation, particular embodiments may employ the techniques disclosed herein in connection with various types of induction logging, including multi-component induction logging.

FIG. 1B illustrates an EM tool 100 in a subterranean environment in accordance with embodiments of the present disclosure. The tool 100 may include a transmitter 110 and a receiver 120 disposed along drillstring 120. Other embodiments may include additional transmitters or receivers. The transmitter 110 may be configured to excite electromagnetic phenomena in the formation. For example, the transmitter 110 may include an antenna coil or a ring electrode coupled with a current source. The receiver 120 may be configured to convert a received electromagnetic signal responsive to the phenomena into an output signal.

Many variations in transmitter and receiver configurations may be successfully employed. Transmitters and receivers may vary in number, location (e.g., with respect to the tool, to one another, to the drill bit, and so on) and orientation (e.g., transverse, longitudinal, tilted, etc.). Some embodiments may include bucking coils or other bucking components. Various sensor arrays of differing types may be placed on the BHA, a number of subs on the drill string, or various combinations of these. As one example, the techniques of the present disclosure are amenable for use with the 3DEX® tool, such as, for example, in connection with anisotropic formation media, or the Rt eXplorer (RTeX) tool, both provided by BAKER HUGHES INCORPORATED.

In operation, tool 100 is configured to effect changes in the transmitter to generate an electromagnetic excitation in the formation at at least one frequency. Signals occur in the receiver antenna(s) responsive to the EM excitation. The signal contains information about formation characteristics. Thus, the receiver produces a response indicative of formation characteristics, such as the parameter of interest. A processor is configured to measure signals.

EM tool 100 lies next to a formation interface 105. Transmitter 110 and receiver 120 lie along a common axis 101 that is horizontally positioned in the upper half-space 102 parallel to the interface and is separated by a distance D from the interface. The term "interface" includes a fluid interface between two different fluids in an earth formation as well as a boundary between two different geologic or stratigraphic intervals in the earth (e.g., distance to bed). Examples following use distance to bed for convenience of illustration, but it should be readily apparent that embodiments wherein distance to an interface of a different type is estimated are within the scope of the disclosure. The upper half-space 102 has a resistivity of 50 Ω-m and the remote formation (lower half-space) 103 is shown to have a resistivity of 2 Ω-m. It should be noted that the coaxial transmitter-receiver configuration shown herein is not to be construed as a limitation and any suitable arrangement including but not limited to an arrangement having a transverse transmitter and/or a transverse receiver may be used.

Figure 2:
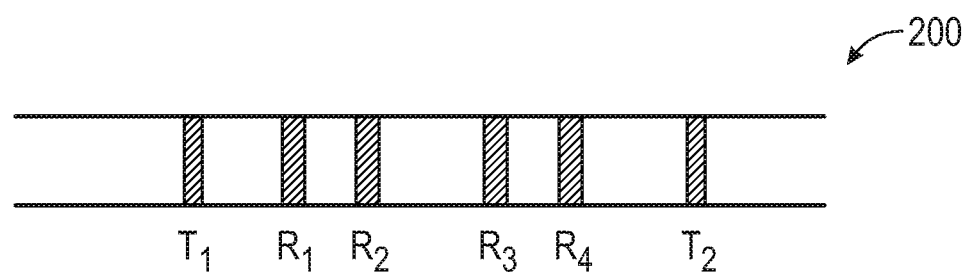
FIG. 2 illustrates a cross-sectional view of a downhole electromagnetic tool in an earth formation in accordance with embodiments of the present disclosure.

FIG. 2 depicts a cross-sectional view of an example downhole tool. The tool 200 may include transmitters T1, T2 and receivers R1-R4. The transmitters T1, T2 may be symmetrically arranged with the receivers R1-R4. For example, the distance from T1 to R1 may be equal to the distance from T2 to R4; and the distance from T1 to R2 may be equal to the distance from T2 to R3. The tool 200 may be configured for induction logging (e.g., based on standing waves and generally less than 100 kHz), multi-array wave propagation logging (e.g., 100 kHz to 10 GHz), and so on as known in the art.

Figure 3A:
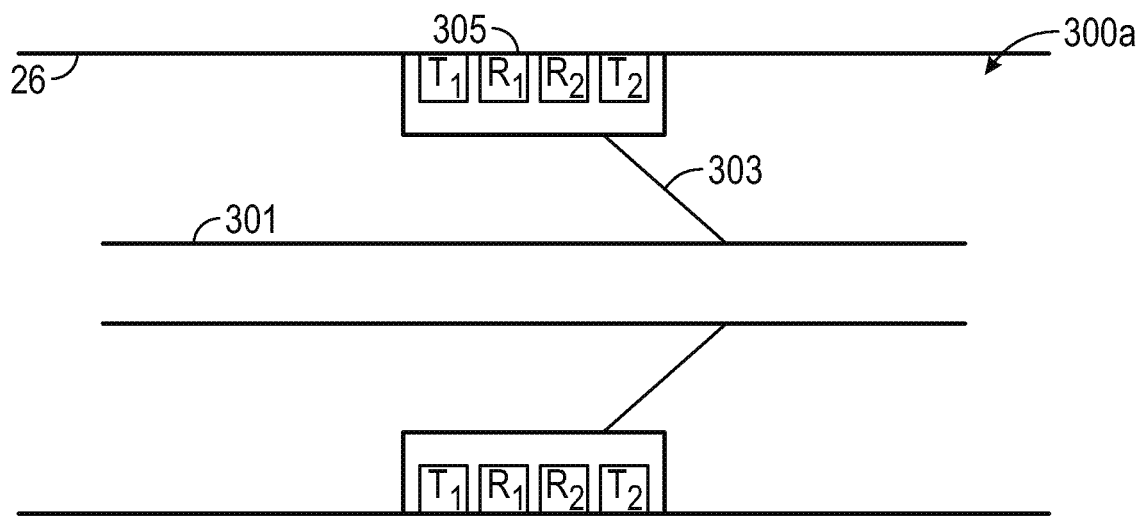
FIGS. 3A & 3B show cross-sectional views of multi-frequency dielectric logging tools in accordance with embodiments of the present disclosure.

FIG. 3A shows downhole logging tool 300 for evaluating an earth formation according to embodiments of the present disclosure. The dielectric tool 300 may be disposed on carrier 11 (not shown) intersecting the earth formation 13. The dielectric tool 300 may include a body (e.g., BHA, housing, enclosure, drill string, wireline tool body) 301 having pads 305 extended on extension devices 303. Two pads are shown for illustrative purposes and, in actual practice, there may be more or fewer pads, such as three pads separated by about 120 degrees circumferentially or six pads separated by about 60 degrees. The extension devices 305 may be electrically operated, electromechanically operated, mechanically operated or hydraulically operated. With the extension devices 303 fully extended, the pads (dielectric tool pads) 305 may engage the borehole 12 and make measurements indicative of at least one parameter of interest of the earth formation, such as a relative phase shift, a relative amplitude, true resistivity, and so on.

Pads 305 may include a face configured to engage the borehole 12. The term "engage," as used herein, may be defined as in contact with the borehole 12, urged against the borehole 26, or positioned proximate the borehole 26. The term "proximate," as used herein, may be defined as the pad being near the borehole 26 such that measurements may be taken from the pad that are useful in evaluating the borehole, earth formation, or both. The term "face" refers to the surface, edge, or side of the tool body or pad that is closest to the borehole wall.

Pads 305 may include transmitter T1, T2 and receivers R1, R2. The transmitters may be configured to radiate EM waves into the formation; and the receivers may be configured to be responsive to the EM waves radiating in the formation and generate a signal that is indicative of the parameter of interest. A processor may be configured to estimate the amplitude attenuation and phase difference between the transmitted signal and the received signals, which are used to estimate the parameter of interest. As an example, the attenuation and phase difference may be estimated between the received signals from at least two spaced receivers.

Figure 3B:
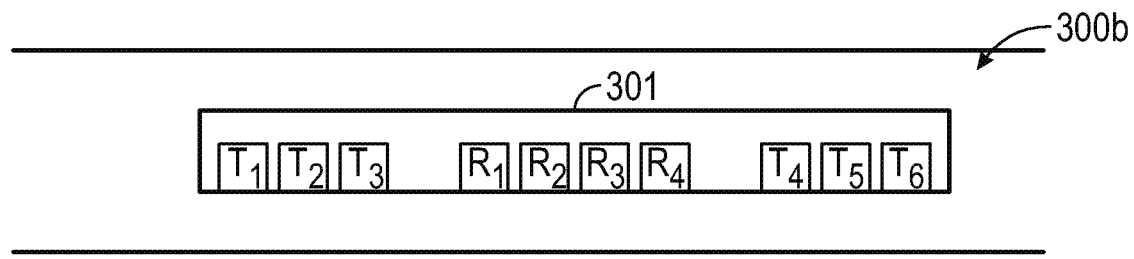

FIG. 3B shows a cross-sectional view of multi-frequency dielectric logging tool in accordance with embodiments of the present disclosure. Dielectric tool 300c may include tool body 301 having transmitters T1-T6 and receivers R1-R4 disposed on tool body 301. In other embodiments, the transmitter-receiver configuration of logging tool 300c may be included on pads 305. Referring to FIGS. 3A-3B, the transmitters may be positioned symmetrically on pads 305 or tool body 301 with respect to the receivers, or staggered at various distances as known in the art.

As non-limiting examples, each transmitter or receiver of the logging tools herein may be configured as a loop antenna, a coil antenna, a monopole antenna, a dipole antenna, an antenna array, a patch antenna, a reflector antenna, a log-periodic antenna, a ring electrode, directional electrode arrays, and so on, including combinations of the above. Each transmitter or receiver may be configured to operate at a plurality of frequencies. Each transmitter or receiver may be configured to have a limited frequency range and tuned to discrete frequencies.

Conventional estimation of true resistivity may include performing a one-dimensional (1D) inversion in order to mitigate effects of near boundary phenomena on resistivity measurements, such as, for example, polarization horn effects. The 1D model may assume parallel horizontal layers in a formation. Inversion operations may include comparing actual measurements to predicted or simulated measurements from a number of models such that a value or spatial variation of resistivity may be determined.

Issues with estimating true resistivity in a logging-while-drilling ('LWD') or measurement-while-drilling ('MWD') context may stem from both the imprecision of conventional models and the constraints of timely delivering the estimate. Because the BHA is constantly advancing, information regarding the properties of the volume of the earth formation the tool is currently located in and its relationship with other parts of the formation must be delivered in a substantially real-time manner to usefully employ the information for the purposes of steering the BHA (e.g., geosteering).

The true formation resistivity (Rt) in a horizontal well is often difficult to accurately determine from conventional resistivity measurements while drilling. In general, apparent resistivity curves show increased values and varied separations due to the horn effects near a boundary. In other words, a higher resistivity reading does not necessarily mean the tool is in a more resistive formation. Further, a curve separation is not virtually distinguishable with the effects resulting from anisotropy. In theory, a full inversion can be used to derive the true formation resistivity of the formation layer in which the tool sits. However, the instability of an inversion due to the lack of variation along measured depth makes the Rt derivation quite challenging.

The present disclosure employs a combination of techniques to deliver robust and precise estimates of Rt in substantially real-time. First, a boundary is assumed. The formation surrounding the tool is divided into two layers which are assumed to run substantially parallel (e.g., within 5 degrees of parallel) with the horizontal borehole. The tool is assumed to be in one of the two layers. A set of model instances of the volume of interest around the tool are represented as a large number of distance values. The distance values represent possible distances from the tool to an interface between the layers (e.g., a boundary). Each model instance of the set represents the volume of interest around the tool as two adjacent layers parallel to a longitudinal axis of the borehole. In each model instance a corresponding interface between the layers (and substantially parallel to the longitudinal axis of the tool) is a unique selected distance (above or below the tool) from the tool to the interface. It may be advantageous to limit the model of the volume of interest around the tool to only two layers separated by one interface.

Figure 4A:
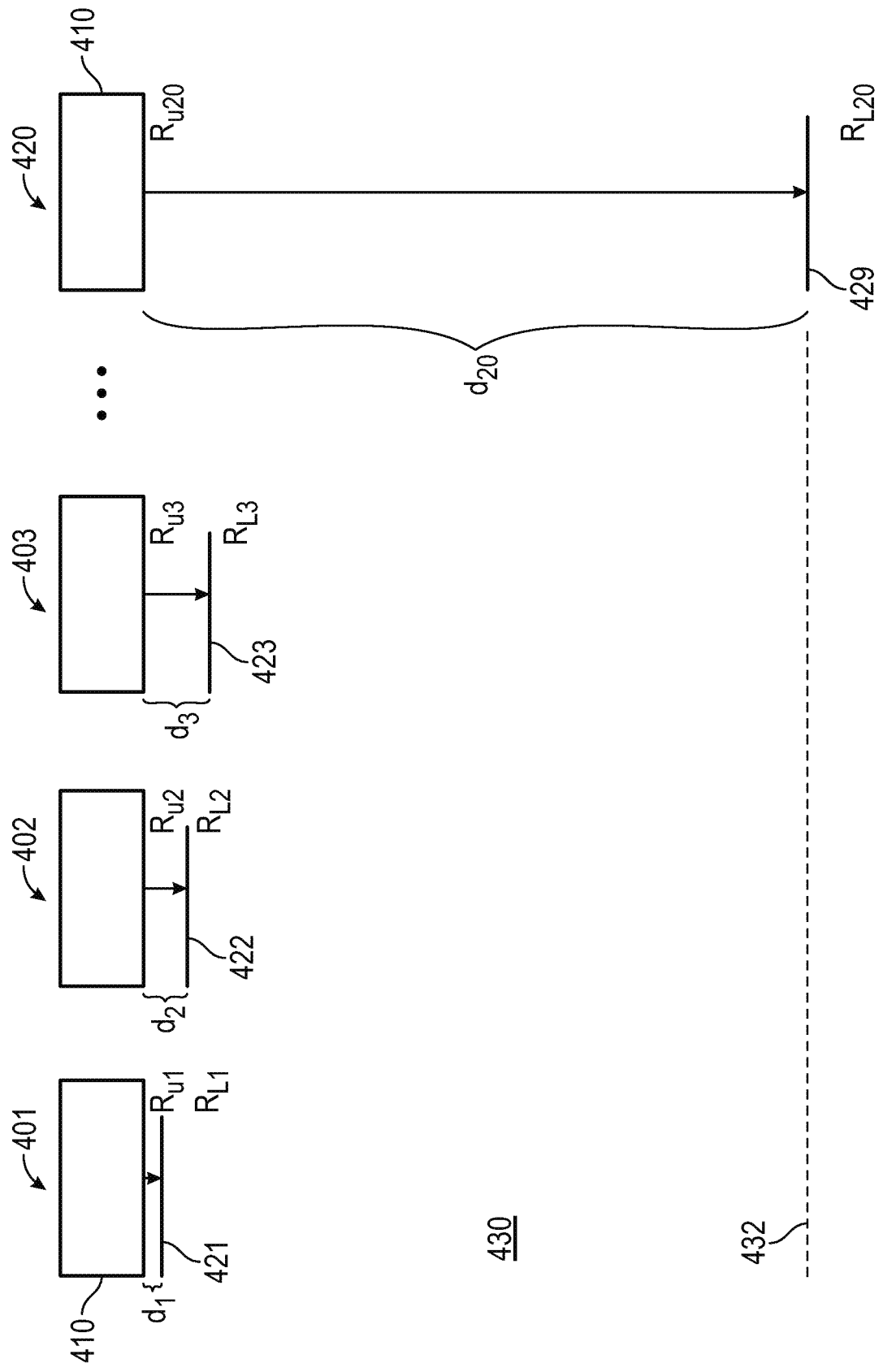
FIGS. 4A & 4B show a representation of techniques for evaluating an earth formation intersected by a borehole in accordance with embodiments of the present disclosure.
Figure 4B:
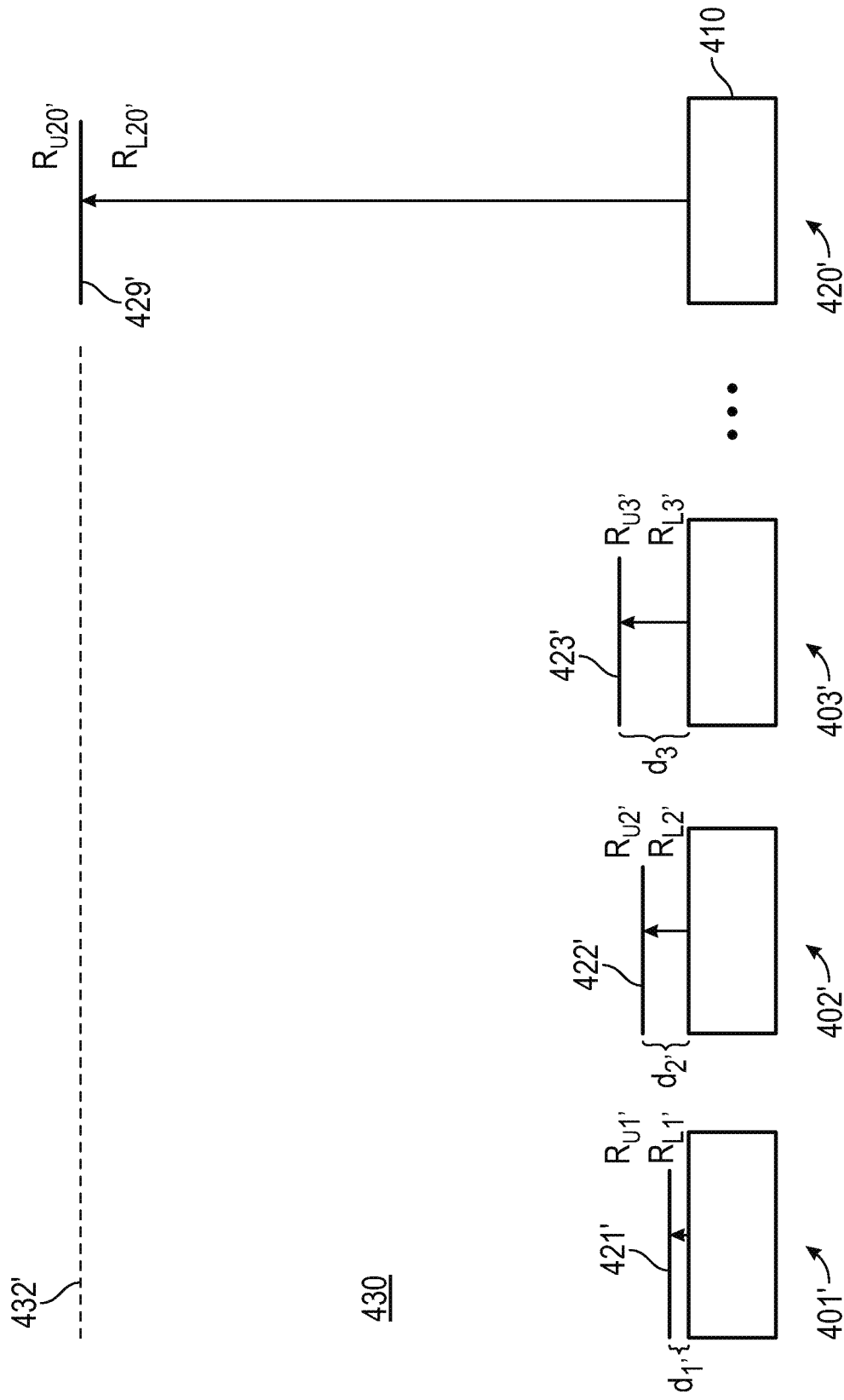

FIGS. 4A & 4B illustrate model instances for evaluating an earth formation intersected by a borehole in accordance with embodiments of the present disclosure. FIGS. 4A & 4B illustrate the set of model instances 401-420 and 401'-420' of the volume of interest 430 around the tool 410 for a number of distance values. The distance values ($d_1$-$d_{20}$ and $d_1'$-$d_{20}'$) represent possible distances from the tool to an interface 421-429, 421'-429' between formation layers. The model instances of the figures correspond to EM measurements at a single borehole depth (measurement depth). The volume of interest may be selected as the practical effective sensitivity range of the tool; that is, the maximum depth of investigation ('MDOI') 432 for the tool.

Each model instance 401-420 and 401'-420' includes a unique distance ($d_1$-$d_{20}$, $d_1'$-$d_{20}'$) to the layer boundary 421-429, and the model instances reflect interfaces at distances ranging from very close to the tool (e.g., minimum appreciable distance 421 to the tool) to very close to the maximum depth of investigation 432 for the tool (429). It may be advantageous to distribute values for the distance throughout the range, either uniformly, with geometric progression of distances, linearly increasing or decreasing distances, or combinations of these. Although for purposes of illustration, FIGS. 4A & 4B are depicted consistent with embodiments wherein n=41, in practice n may be significantly higher. In some implementations, n may be within a range from 100 to 1000. In some embodiments, the practical effective sensitivity range of the tool may be 3 to 4 meters, with 150 model instances having uniformly distributed unique distances from the tool to boundary.

Parametric inversion techniques are used to identify layer resistivities for the two adjacent layers of the instance for each of the distance values—upper layer resistivity ($R_{Ui}$) and lower layer resistivity ($R_{Li}$). This may include determining resistivity values which minimize a difference (e.g., misfit) between expected measurement values corresponding to the distance value and actual values of the EM measurements. Moving window analysis and regularization may be used to stabilize the inversion. For example, physical constraints (e.g., range of inversion parameters) may be applied and selected parameters minimized within all models of slightly larger misfits than the minimum. Neural networks may be used to estimate tool responses (as well as derivatives) for the expected measurement values. The identified layer resistivities may be associated with the unique distance value (instance). The minimized misfit associated with the distance and corresponding identified layer resistivities may be employed in further aspects as shown below.

A subset of distance values (or model instances) are selected which correspond to a subset of least misfits. This may be accomplished by selecting layer resistivities corresponding to a minimum misfit, as well as those corresponding to additional misfits which are relatively close in value to the minimum misfit. For example, additional misfits below a threshold value may be selected, and the threshold value may be a function of the minimum misfit (e.g, within a percentage value, standard deviation, or the like of the minimum misfit). As one example, the threshold may be within 5 percent of the minimum misfit.

Upper and lower layer resistivities corresponding to the subset of least misfits may be further processed. In one example, a distance value (model instance) associated with a minimum layer resistivity is identified. In some cases a minimum lower- or minimum upper layer resistivity is identified. The true resistivity may be estimated as either that lower layer resistivity or that upper layer resistivity associated with the identified distance value for measurements. In some implementations, in each model instance, the interface 421-429, 421'-429' may be represented as a depth value 0 on a number line with negative values above the interface and positive values below the interface. Thus the true resistivity may be estimated as the lower layer resistivity when the identified distance value for measurements is greater than zero and as the upper layer resistivity when the identified distance value for measurements is less than zero.

The method is verified with synthetic models and then applied to field data. The processing of synthetic data and field data shows the advantages of the method in determining the formation true resistivity. The distance value and upper and lower resistivities identified for each instance 401, 402, 403, 420 are shown below.

| i | Instance | Distance | $R_{Ui}$ | $R_{Li}$ | Least Misfit |
|---|---|---|---|---|---|
| 1 | 420 | −40 inches | 10 | 0.5 | 5.0 |
| ... | ... | ... | ... | ... | ... |
| 18 | 403 | −6 inches | 45 | 12 | 2.0 |
| 19 | 402 | −4 inches | 50 | 2 | 1.1 |
| 20 | 401 | −2 inches | 60 | 3 | 0.9 |
| 21 | | 0 inches | 20 | 3 | 15.4 |
| 22 | 401' | 2 inches | 60 | 3 | 3.5 |
| 22 | 402' | 4 inches | 50 | 1 | 2.1 |
| 24 | 403' | 6 inches | 45 | 12 | 2.2 |
| ... | ... | ... | ... | ... | ... |
| 41 | 420' | 40 inches | 100 | 20 | 12.0 |

In the example above, for the formation being evaluated, the distance to the interface is approximately 4 inches from the tool and the tool sits in the upper layer. The upper layer has a resistivity of 50 Ω-m and the lower layer has a resistivity of 2 Ω-m. Using the techniques of the present disclosure, a subset of least misfits (0.9, 1.1) corresponding to instance 401 and 402 (distance −2 inches and distance −4 inches) are selected. The minimum lower layer resistivity corresponding to the subset is identified as 2 Ω-m, which identifies instance 402 (distance of −4 inches) as the correct model. True resistivity is then estimated as 50 Ω-m for measurements since the distance is negative (the tool is in the upper layer).

Figure 5A:
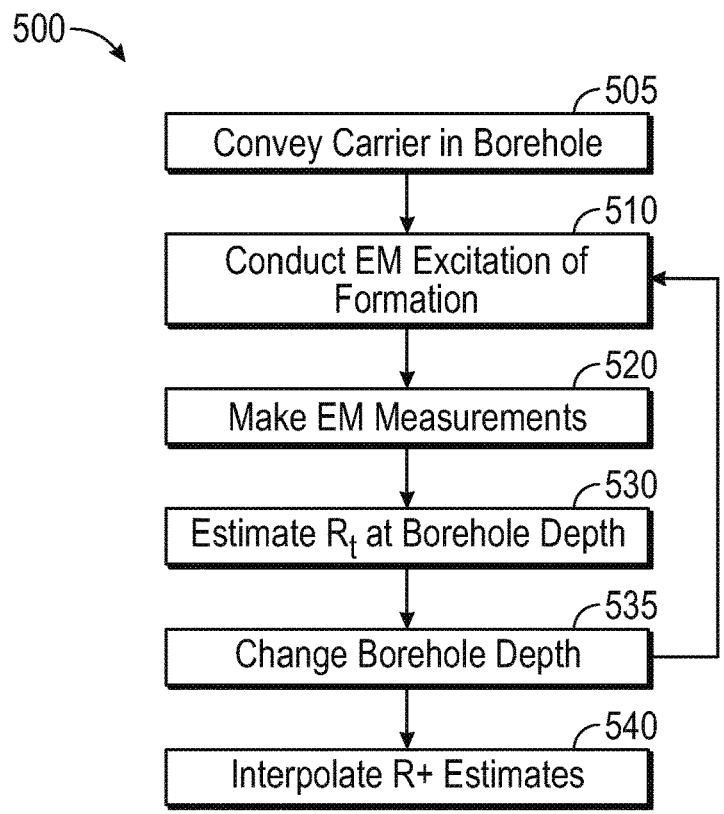
FIGS. 5A & 5B show flow charts of methods in accordance with embodiments of the present disclosure.

FIG. 5A is a flow chart illustrating methods in accordance with embodiments of the present disclosure. Optional step 505 of method 500 comprises conveying a carrier into a borehole intersecting the formation. The carrier may be a component of a tool string. In some examples the carrier may be a component of a drillstring, and conveyance of the drillstring may be carried out by advancing the drillstring and extending the borehole via rotation of a drill bit.

Optional step 510 comprises conducting an EM excitation of the formation at at least one frequency at a plurality of borehole depths. As one example, a propagating wave may be excited using a transmitter as part of an EM tool as described above. The EM tool may include several connected or unconnected subs. Optional step 520 comprises making electromagnetic (EM) measurements while drilling using the EM tool in a substantially horizontally aligned section of the borehole responsive to an EM excitation of the formation at at least one frequency at a borehole depth. Steps 510 and 520 may be carried out by using at least one processor to direct or control transmitters and receivers directly, or by using commands to intermediate processors (e.g., controllers, DSPs, and the like) in operative connection with measurement circuitry including signal generators, amplifiers, power sources, data storage, etc. to generate and measure electromagnetic phenomena (e.g., currents, charges, fields, standing waves, or propagating waves, etc).

Step 530 comprises estimating, at each of a plurality of borehole depths, a true resistivity of a volume of interest of the formation in which the tool is located in substantially real time while on the single logging run while drilling. The volume of interest may be defined by a region of the formation extending substantially from a wall of the borehole to a maximum depth of investigation for the tool. Optional step 535 comprises changing borehole depth. Steps 510-535 may be repeated.

Step 540 comprises interpolating one or more of the true resistivity estimates over a window of multiple depths of the plurality of depths using a subset of the true resistivity estimates by correcting outlier values. Interpolating may include smoothing the true resistivity estimates for the plurality of borehole depths by adjusting the true resistivity estimate for at least one borehole depth. Step 540 may include selecting a window length for the window based on at least one of: i) variation of the EM measurements along the borehole; ii) a resolution of formation changes in the window. The window length may be fixed (e.g., in terms of depth) and the number of measurement depths (e.g., estimates of true resistivity) in the window may vary over time. The subset may be selected from a group of most closed resistivity values. True resistivity values estimated at earlier depths may be used as inputs for later estimations.

Figure 5B:
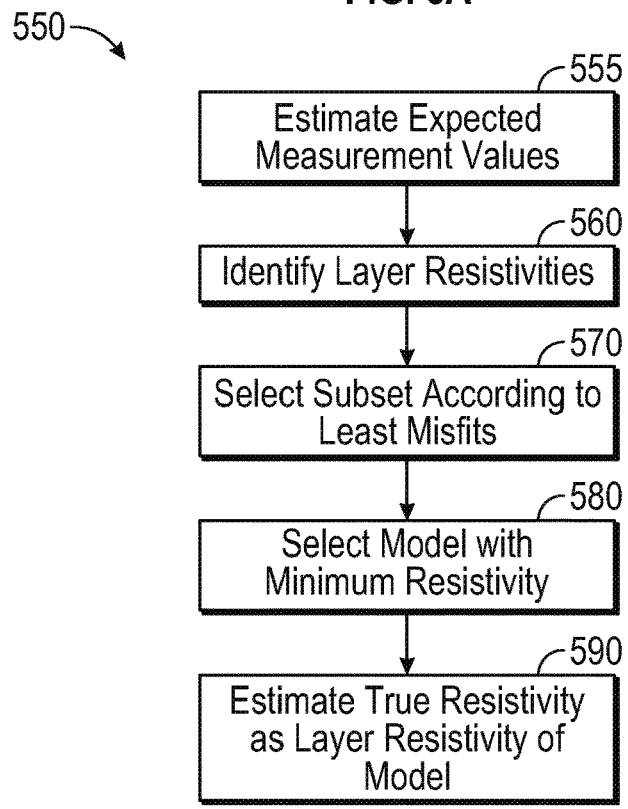

FIG. 5B is a flow chart illustrating methods in accordance with embodiments of the present disclosure for estimating at a borehole depth a true resistivity of a volume of interest of the formation in which the tool sits in substantially real time. Optional step 555 of method 550 comprises estimating the expected measurement values. Step 555 may be carried out using at least one trained artificial neural network, or as referred to herein below, simply, 'neural network.' Using neural networks for calculating tool responses and derivatives provides estimates with speed sufficient for real-time use in a moving LWD/MWD tool. The neural network may be trained using synthetic tool responses for a plurality of two-layer models, each model of the plurality of models having an associated upper layer resistivity, a lower layer resistivity, and a distance from a model tool to a model interface. The neural network is described in greater detail with reference to FIG. 6 below.

Step 560 comprises identifying, for a set of distance values representing possible distances from the tool to an interface between two adjacent layers substantially parallel to a longitudinal axis of the tool, layer resistivities corresponding to the two adjacent layers for each distance value by minimizing a misfit function; that is, a difference between expected measurement values corresponding to the distance value and actual values of the EM measurements. Identifying the layer resistivities may include enforcing at least one of: i) resistivity limits, and ii) relative change relationships. The difference may be estimated as a weighted $L_2$ norm between the expected measurement values and the actual values, shown as $$\|D_{pred} - D_{meas}\|_2.$$

Step 570 comprises selecting a subset of distance values corresponding to a subset of least misfits. As described above, selecting the subset may be carried out by selecting a distance value (or model instance) corresponding to a minimum misfit and then selecting a distance value (or model instance) of at least one additional misfit close to the minimum. For example, additional misfits may be selected if below a threshold value, wherein the threshold value is a function of the minimum misfit. Each distance value (or model instance) selected is associated with an upper layer resistivity and a lower layer resistivity. Step 580 comprises identifying a distance value (or model instance) associated with a minimum resistivity. The minimum resistivity may be a lowest resistivity value of those resistivities associated with the subset of least misfits.

Step 590 comprises estimating true resistivity. The distance value (or model instance) associated with the minimum resistivity has associated with it an upper layer resistivity and a lower layer resistivity. The minimum resistivity may be either. The true resistivity may be estimated as either that upper layer resistivity or that lower layer resistivity associated with the identified distance value. Note that, when using the model above wherein the interface is represented as the origin distance (0), the distance is a negative value when tool is in the upper layer and is positive value when the tool is in the lower layer. Step 590 may therefore be carried out by estimating true resistivity as the lower layer resistivity when the identified distance value for measurements is greater than zero, and estimating true resistivity as the upper layer resistivity when the identified distance value for measurements is less than zero.

Other optional steps include conducting secondary recovery operations in dependence upon the estimated true resistivity. Secondary recovery operations may include any or all of drilling operations, injection operations, production operations, and the like. For example, the method may include commencing, modifying, continuing, or halting one or more drilling or production operations in dependence upon a model of the formation characterizing particular volumes of interest as having particular values of estimated true resistivity.

Due to the complexity of the calculations required, computing tool responses using standard software generally requires an inordinately long time, and such operations are extremely processing-power intensive. Thus, simulation of tool responses using these methods is unsuitable for practical real-time implementation in the field. The neural network model may be stored in a suitable computer-readable medium accessible to a processor (such as a surface processor and/or downhole processor, or a remote processor, as described above) during or after drilling operations.

Figure 6:
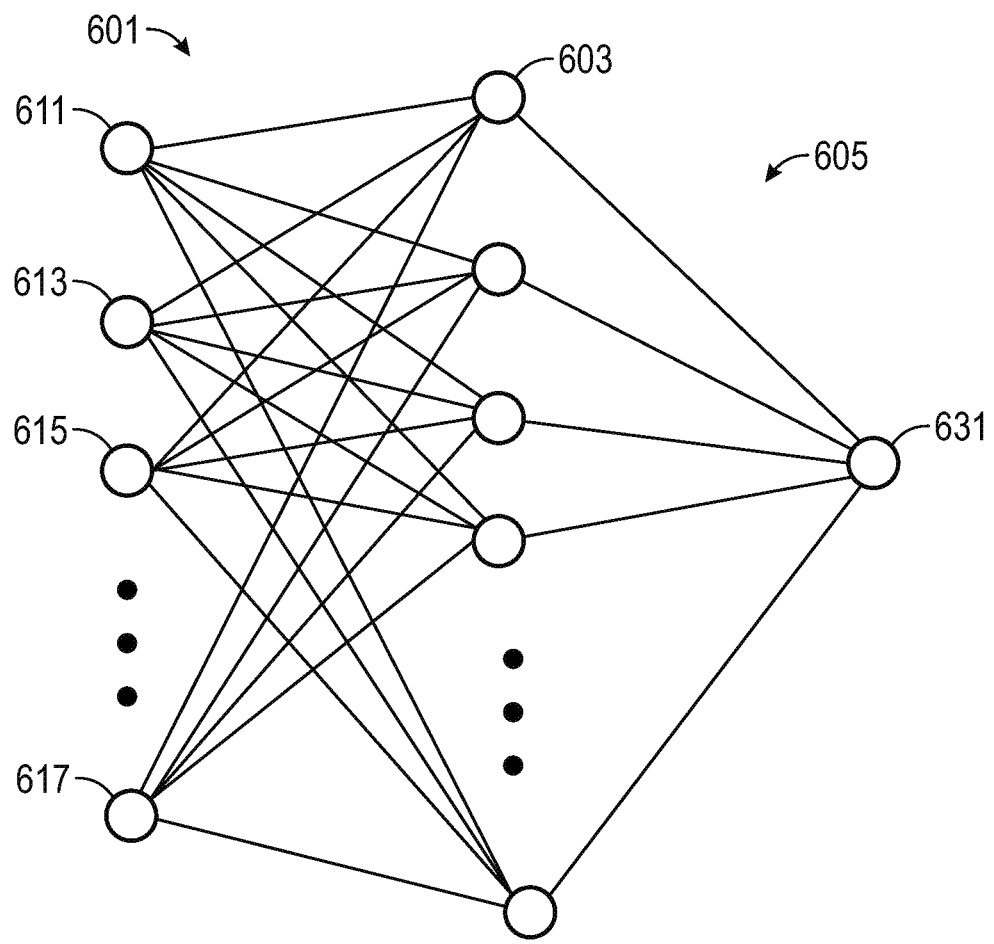
FIG. 6 a neural network in accordance with embodiments of the present disclosure.

FIG. 6 illustrates an artificial neural network model for use with drilling assemblies in accordance with embodiments of the present disclosure. FIG. 6 illustrates a neural network 300 having a single hidden layer 603. The input layer 601 includes a number of processors depicted by 611, 613, 615 and 617. The input to the input layer may include information correlated to the tool response to be estimated (e.g., one or more tool parameters, properties of the formation, borehole, or downhole fluid, or other parameters of interest). In some examples, this information is related only to measurements (actual or simulated) of values of parameters at one or more sensors, such as, for example, representative of measurements or a function of measurements. If the tool parameter is temperature, the input may be temperature values at sensors on the tool. In other cases, the information is also related to previous information from other tools or formation parameters. The hidden layer 603 includes a plurality of processors and the output layer in this example has a single processor. Other embodiments may include a plurality of hidden layers.

In the example shown, the processor of the output layer 605 provides a weighted combination of the outputs of each of the outputs of the processors of the hidden layer 605. The output of each of the processors in hidden layer 605 is a weighted combination of each of the outputs of the processors 611, 613, 615 . . . 617 of the input layer.

The neural network may be trained by providing a set of input values (i.e., a sample) to the input layer. The output 631 of the output layer 605 is compared to the "correct" value of the tool response corresponding to the set of input values for the sample. The "correct value" may be defined as the value generated from conventional techniques which are understood to be sufficiently similar to the value that would be determined from sensor measurements (or, alternatively, to the true value) in conditions corresponding to the input set, and may be obtained from measurement, simulated using standard software, and so on. In the training phase, this is done for a set of samples called the "training set" and the weights at each of the processors is adjusted to improve a match between the outputs 631 and the correct value for each set of input values in the training set. The training process may be terminated when convergence is reached. Convergence may be determined when the incremental change in the weights is very small, or after a given number of samples have been processed.

Following the training phase, the weights are kept fixed and a plurality of samples called the "test set" may be processed using the neural network with the fixed weights. If good agreement is noted between simulated and actual measurements in the test set, then the neural network is considered to be trained, and then is installed in the processor of the BHA or data processing system on the surface (or on another remote processor, or downhole processor) for use during drilling operations. If good agreement is not noted in the test set between the simulated and the actual measurements, then further training is carried out. For aspects of neural network design, including training, tradeoffs may exist between accuracy of results, scope of application, and speed of calculation. Specific implementations may be designed according to specific applications in specific contexts.

Figure 7:
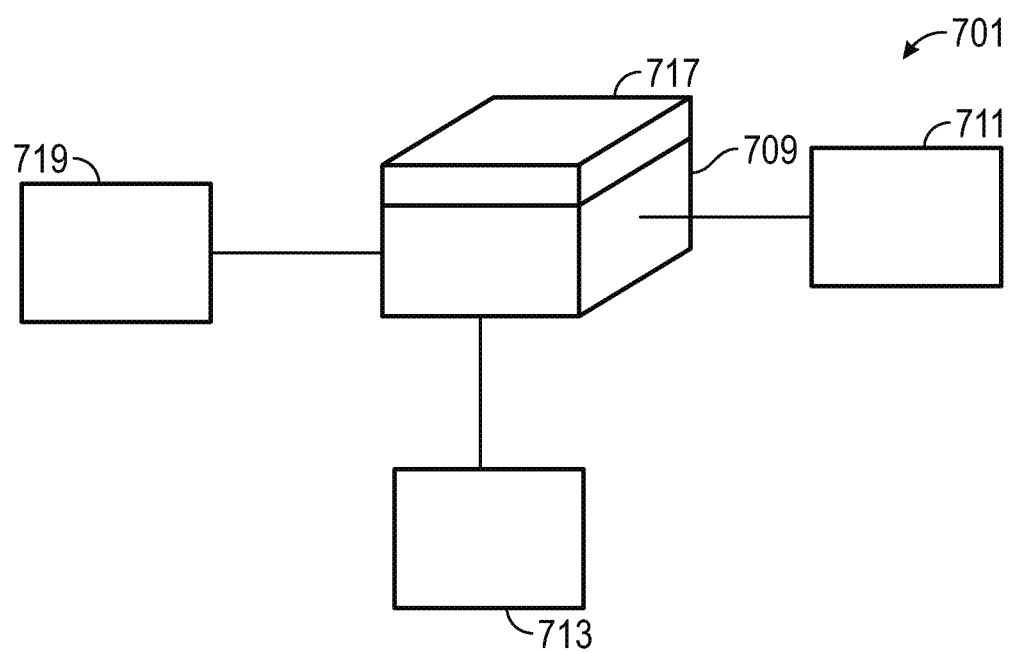
FIG. 7 shows a schematic of information processing system for implementing methods in accordance with embodiments of the present disclosure.

FIG. 7 shows an information processing system 700, which may be implemented with a hardware environment that includes a processor 701, an information storage medium 710, an input device 720, processor memory 730, and may include peripheral information storage medium 740. The hardware environment may be in the well, at the rig, or at a remote location. Moreover, the several components of the hardware environment may be distributed among those locations. The input device 720 may be any data reader or user input device, such as data card reader, keyboard, USB port, etc. The information storage medium 710 stores information provided by the detectors. Information storage medium 710 may include any non-transitory computer-readable medium for standard computer information storage, such as a USB drive, memory stick, hard disk, removable RAM, EPROMs, EAROMs, flash memories, optical disks, hard disks, or other commonly used memory storage system known to one of ordinary skill in the art including Internet or network based storage. Information storage medium 710 stores a program that when executed causes information processor 701 to execute the disclosed methods. Information storage medium 710 may also store the formation information provided by the user, or the formation information may be stored in a peripheral information storage medium 740, which may be any standard computer information storage device, such as a USB drive, memory stick, hard disk, removable RAM, or other commonly used memory storage system known to one of ordinary skill in the art including Internet or network based storage. Processor 701 may be any form of processor or mathematical processing hardware, including Internet or network based hardware. When the program is loaded from information storage medium 710 into processor memory 730 (e.g. computer RAM), the program, when executed, causes information processor 701 to retrieve sensor information from either information storage medium 710 or peripheral information storage medium 740 and process the information to estimate a parameter of interest. Processor 701 may be located on the surface or downhole (e.g., downhole tool 100).

Implicit in the processing of the data is the use of logic implemented on a suitable medium, such as computer program instructions on non-transitory machine-readable medium (non-transitory computer-readable medium), that enables a processor to perform the control and processing.

In several non-limiting aspects of the disclosure, a processor includes a computer that executes programmed instructions for performing various methods. These instructions may provide for equipment operation, control, data collection and analysis and other functions in addition to the functions described in this disclosure. Thus, configuration of the processor may include operative connection with resident memory and peripherals for executing programmed instructions. The processor may execute instructions stored in computer memory accessible to the processor, or may alternatively employ logic implemented as field-programmable gate arrays ('FPGAs'), application-specific integrated circuits ('ASICs'), other combinatorial or sequential logic hardware, and so on.

In some embodiments, estimation of true resistivity or control of operations may involve applying a model. The model may include, but is not limited to, (i) a mathematical equation, (ii) an algorithm, (iii) a database of associated parameters, or a combination thereof.

The non-transitory machine-readable medium may include ROMs, EPROMs, EAROMs, Flash Memories, Optical disks, and Hard disks. As noted above, the processing may be done downhole or at the surface, by using one or more processors. In addition, results of the processing, such as an image of a resistivity property or permittivity, can be stored on a suitable medium.

The term "information" as used herein includes any form of information (analog, digital, EM, printed, etc.). As used herein, a processor is any information processing device that transmits, receives, manipulates, converts, calculates, modulates, transposes, carries, stores, or otherwise utilizes information.

The term "conveyance device" or "carrier" as used above means any device, device component, combination of devices, media and/or member that may be used to convey, house, support or otherwise facilitate the use of another device, device component, combination of devices, media and/or member. Exemplary non-limiting conveyance devices include drill strings of the coiled tube type, of the jointed pipe type and any combination or portion thereof. Other conveyance device examples include casing pipes, wirelines, wire line sondes, slickline sondes, drop shots, downhole subs, BHA's, drill string inserts, modules, internal housings and substrate portions thereof, and self-propelled tractors.

The term "near real-time" as applied to methods of the present disclosure refers to an action performed while the BHA is still downhole and prior to the drill bit extending the borehole a distance of 1 meter, 0.5 meters, 0.25 meters, 0.1 meters, or less; and may be defined as estimation of true resistivity within 15 minutes of measurement, within 10 minutes of measurement, within 5 minutes of measurement, within 3 minutes of measurement, within 2 minutes of measurement, within 1 minute of measurement, or less. "Substantially different" as used herein means not substantially the same. "Substantially the same," or "substantially similar" as used herein means a value consistent with a general formation structure or feature, or having a value within a common statistical deviation, such as within one standard deviation, within 5 percent, within 1 percent of a moving average and so on. Substantially the same refers to values within the generally held value for common deviation, such as, for example, due to noise. "Borehole depth" refers to measured depth, or the depth that the distal end of the tool string has traveled along the borehole. Borehole depth will thus increase with extension of the borehole in a horizontal plane.

While the foregoing disclosure is directed to specific embodiments of the disclosure, various modifications will be apparent to those skilled in the art. It is intended that all variations be embraced by the foregoing disclosure.

What is claimed is:

1. A method of evaluating an earth formation intersected by a borehole, the method comprising:
   making electromagnetic (EM) measurements on a single logging run while drilling using an EM tool on a tool string in a substantially horizontal section of the borehole responsive to an EM excitation of the formation at at least one frequency at a plurality of borehole depths;
   estimating, at each of the plurality of borehole depths, a true resistivity of a volume of interest of the formation in which the tool sits in near real-time while on the single logging run while drilling by:
      identifying, for a set of distance values representing possible distances from the tool to an interface between two adjacent layers substantially parallel to a longitudinal axis of the tool comprising an upper layer and a lower layer, layer resistivities corresponding to the two adjacent layers for each distance value by minimizing a difference between expected measurement values corresponding to the distance value and actual values of the EM measurements;
      selecting a subset of distance values corresponding to a subset of least misfits;
      identifying a distance value from the subset of distance values that is associated with identified layer resistivities including a minimum resistivity;
      estimating true resistivity as either that upper layer resistivity or that lower layer resistivity associated with the identified distance value;
      interpolating one or more of the true resistivity estimates over a window of multiple depths of the plurality of depths using a subset of the true resistivity estimates by correcting outlier values.

2. The method of claim 1 wherein interpolating comprises smoothing the true resistivity estimates for the plurality of borehole depths by adjusting the true resistivity estimate for at least one borehole depth.

3. The method of claim 1 wherein the volume of interest is modeled with the interface represented as a depth value 0 on a number line with negative value above the interface and positive values below the interface, the method comprising estimating true resistivity as the lower layer resistivity when the identified distance value for measurements lies at a point greater than zero in the model, and estimating true resistivity as the upper layer resistivity when the identified distance value for measurements lies at a point less than zero in the model.

4. The method of claim 1 wherein the difference comprises a weighted $L_2$ norm between the expected measurement values and the actual values.

5. The method of claim 1 comprising wherein identifying the layer resistivities comprises enforcing at least one of: i) resistivity limits, and ii) relative change relationships.

6. The method of claim 1, comprising selecting a window length for the window based on at least one of: i) variation of the EM measurements along the borehole; ii) a resolution of formation changes in the window.

7. The method of claim 6, wherein the window length is fixed and the number of measurement depths in the window varies over time.

8. The method of claim 1 comprising estimating the expected measurement values using at least one neural network.

9. The method of claim 8 wherein the neural network is trained using synthetic tool responses for a plurality of two-layer models, each model of the plurality of models comprising an upper layer resistivity, a lower layer resistivity, and a distance from a model tool to a model interface.

10. The method of claim 1 wherein the volume of interest comprises a region of the formation extending from a wall of the borehole to a maximum depth of investigation for the tool.

11. The method of claim 1 further comprising selecting the subset from a group of most closed resistivity values.

12. The method of claim 1 comprising using true resistivity values estimated at earlier depths as inputs for later estimations.

13. The method of claim 1 wherein selecting the subset of layer resistivities corresponding to the subset of least misfits comprises selecting the subset of layer resistivities corresponding to a minimum misfit and at least one additional misfit below a threshold value, wherein the threshold value is a function of the minimum misfit.

14. An apparatus for evaluating an earth formation intersected by a borehole, the apparatus comprising:
   a drill string comprising an electromagnetic measurement tool configured to make electromagnetic (EM) measurements on a single logging run while drilling responsive to an EM excitation of the formation at at least one frequency at a plurality of borehole depths;
   a processor configured to estimate, while the tool is in a substantially horizontal section of the borehole, at each of the plurality of borehole depths, a true resistivity of a volume of interest of the formation in which the tool sits in near real-time while on the single logging run while drilling by:
      identifying, for a set of distance values representing possible distances from the tool to an interface between two adjacent layers substantially parallel to a longitudinal axis of the tool, layer resistivities corresponding to the two adjacent layers for each distance value by minimizing a difference between expected measurement values corresponding to the distance value and actual values of the EM measurements;

selecting a subset of distance values corresponding to a subset of least misfits;

identifying a distance value from the subset of distance values that is associated with identified layer resistivities including a minimum resistivity;

estimating true resistivity as either that upper layer resistivity or that lower layer resistivity associated with the identified distance value;

interpolating one or more of the true resistivity estimates over a window of multiple depths of the plurality of depths using a subset of the true resistivity estimates by correcting outlier values.

15. The apparatus of claim 14 wherein interpolating comprises smoothing the true resistivity estimates for the plurality of borehole depths by adjusting the true resistivity estimate for at least one borehole depth.

16. The apparatus of claim 14 wherein the difference comprises a weighted $L_2$ norm between the expected measurement values and the actual values.

17. The apparatus of claim 14 wherein the processor is configured to identify the layer resistivities by enforcing at least one of: i) resistivity limits, and ii) relative change relationships.

18. The apparatus of claim 14, wherein the processor is configured to select a window length for the window based on at least one of: i) variation of the EM measurements along the borehole; ii) a resolution of formation changes in the window.

19. A method of evaluating an earth formation intersected by a borehole, the method comprising:

making electromagnetic (EM) measurements on a single logging run while drilling using an EM tool on a tool string in a substantially horizontal section of the borehole responsive to an EM excitation of the formation at at least one frequency at a plurality of borehole depths;

estimating, at each of the plurality of borehole depths, a true resistivity of a volume of interest of the formation in which the tool sits in near real-time while on the single logging run while drilling by:

identifying, for a set of distance values representing possible distances from the tool to an interface between two adjacent layers substantially parallel to a longitudinal axis of the tool comprising an upper layer and a lower layer, layer resistivities corresponding to the two adjacent layers for each distance value by minimizing a difference between expected measurement values corresponding to the distance value and actual values of the EM measurements;

selecting a subset of distance values corresponding to a subset of least misfits;

identifying a distance value from the subset of distance values that is associated with identified layer resistivities including a minimum resistivity; and estimating true resistivity as either that upper layer resistivity or that lower layer resistivity associated with the identified distance value.

20. The method of claim 1 wherein the interface is outside the borehole and substantially parallel to the longitudinal axis of the tool.

* * * * *